F. W. STALKER, F. K. TAYLOR, AND L. B. SWIFT.
CIRCUIT CLOSING MECHANISM.
APPLICATION FILED FEB. 28, 1917.
1,435,186. Patented Nov. 14, 1922.
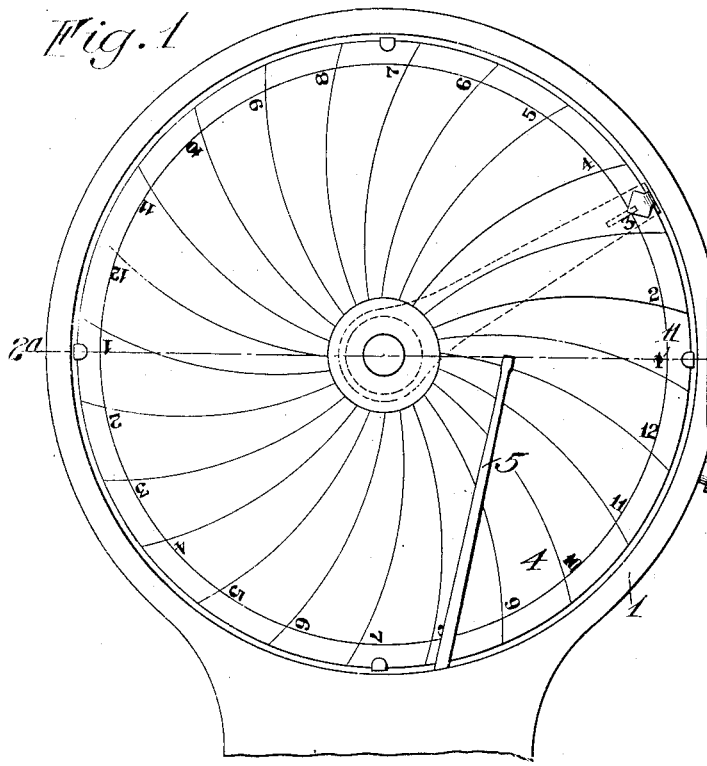
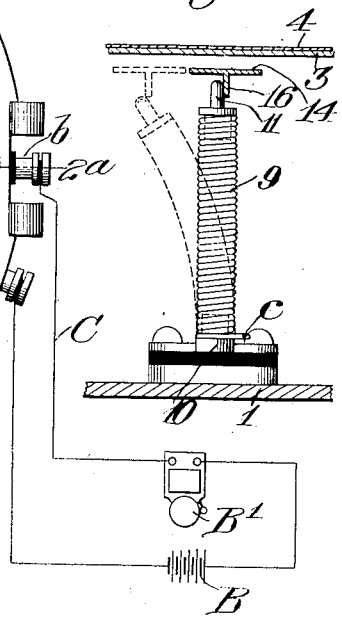
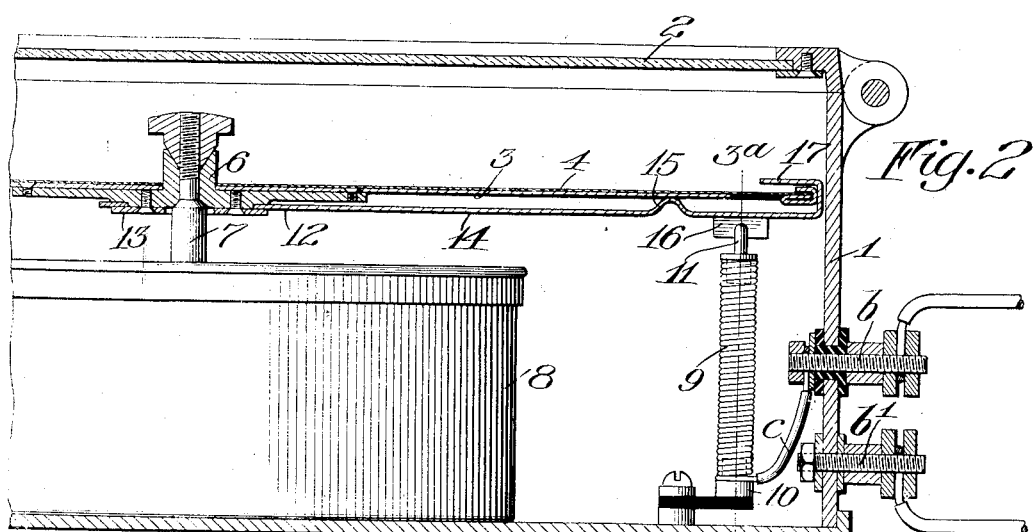
INVENTORS
Frederick W. Stalker, Fred K. Taylor,
Lewis B. Swift.
their ATTORNEYS Patented Nov. 14, 1922.

1,435,186

UNITED STATES PATENT OFFICE.

FREDERICK W. STALKER, FRED K. TAYLOR, AND LEWIS B. SWIFT, OF ROCHESTER, NEW YORK, ASSIGNORS TO TAYLOR INSTRUMENT COMPANIES, OF ROCHESTER, NEW YORK, A CORPORATION OF NEW YORK.

CIRCUIT-CLOSING MECHANISM.

Application filed February 28, 1917. Serial No. 151,421.

*To all whom it may concern:*

Be it known that we, FREDERICK W. STALKER, FRED K. TAYLOR, and LEWIS B. SWIFT, all of Rochester, in the county of Monroe and State of New York, have invented certain new and useful Improvements in Circuit-Closing Mechanism; and we do hereby declare the following to be a full, clear, and exact description of the same, reference being had to the accompanying drawings, forming a part of this specification, and to the reference numerals marked thereon.

Our invention has for its purpose to provide a mechanism for automatically closing an electric circuit at a predetermined instant during the operation of an indicating or recording machine in order to give an alarm or effect some secondary operation, and it is particularly applicable to time controlled temperature instruments and the like. In a more particular aspect, the invention is intended to provide a simple mechanism that is readily adjustable to effect closing of an electric circuit at any selected and predetermined time and to complete the circuit closing operation without interfering with the continuous movement of the parts of the recording or indicating mechanism. A further object of the improvement is to eliminate chance of breakage or injury to the contact or circuit closing members. To these and other ends the invention consists in certain improvements and combinations of parts, all as will be hereinafter more fully described, the novel features being pointed out in the claims at the end of the specification.

In the drawings:

Figure 1 is a plan view, partly in diagram, showing the application of the invention to a temperature recorder;

Figure 2 is a vertical sectional view on the line 2ª—2ª of Figure 1, and

Figure 3 is a sectional view on the line 3ª—3ª of Figure 2.

Similar reference characters in the several figures indicate the same parts.

The invention may be carried out in various ways, and we have illustrated it in the present embodiment for illustrative purposes merely, and without any intention of limiting the scope of the improvement to the particular mechanism disclosed, which consists of a temperature recorder comprising a casing 1 and a transparent cover 2. Arranged within the casing 1 is a chart holder 3 upon which may be mounted a suitable chart 4 of paper or similar material to receive the markings of a temperature controlled marking arm or pen 5, which is operated by a thermostat, as usual in this class of devices. The chart holder 3 is mounted upon a hub 6 fixedly secured to the central arbor 7, which is rotated by a clock mechanism, indicated diagrammatically at 8, and which for the purpose of the present invention it is unnecessary to set forth in detail. In the operation of this mechanism, the chart 4 is rotated at a constant speed and a continuous mark is placed thereon by the pen 5 so that a complete temperature record is kept and at any time can be seen at a glance upon the chart, which may be of any size with relation to the speed of the driving or time mechanism so that a complete rotation will be effected once in every so many hours, and it is frequently desirable to control a secondary mechanism automatically at a predetermined instant in the operation of the temperature recorder. This secondary operation may consist in opening or closing a valve or damper, or stopping the movement of the clock mechanism already referred to, or giving a signal or alarm, and in the structure illustrated we have shown devices operating to effect a bell alarm. With this in view, there is provided a circuit C connected to binding posts *b* and *b'*, and including a battery B and bell B'. From the binding post *b*, a conductor *c* leads to a circuit closer, which includes a tubular coiled spring 9. The lower end of the coil spring 9 is fixedly mounted on a stationary and insulated pin or support 10, and at the upper or free end is arranged a conducting member in the form of a pin 11 which is located in the path of a contact member on the chart holder. Thus the conducting member 11 is freely yieldable in any direction but normally assumes an upright position to engage the contact member, which is presently to be described, although the yieldability of the spring 9 is such as to permit the contact member to move past the conducting member 11 by forcing the same to one side as shown in dotted lines in Figure 3 and without stopping or interfering with the movement of the chart holder.

The chart holder is provided with a contact member which includes a plate 12 that is rotatively arranged upon the hub 6 and held in place by the retaining disc 13. The plate 12 carries the arm or extension 14 which is corrugated or bent inwardly at 15 to form a lug having frictional engagement with the under side of the chart holder 3. The lug 15 thus acts to retain the contact member in any adjusted position upon the chart holder and to permit adjusting movement upon the application of slight pressure. The arm 14 is further provided with a contact portion 16 which travels in a path passing through the conducting member 11 of the circuit closer already described. At its outer end the arm 14 is bent upwardly and inwardly, affording an indicator 17 overlying the top of the chart holder and cooperating with time indicia upon the chart on the holder so that the contact member can be easily adjusted to any point on the chart holder and in such manner that the electric circuit will be automatically closed and an alarm given at two hours, four hours, or any other predetermined length of time after the adjustment is made. The contact portion 16 forming part of the contact member on the chart holder is electrically connected through the parts of the mechanism and the casing 1 to the binding post $b'$, so that when the contact portion 16 engages the conducting member 11, the circuit C is closed and an alarm is given. The operation of the alarm bell or such other electrically controlled operation as may be desired is continued as long as the contact portion 16 and conducting member 11 are engaged, that is to say, until the chart holder has moved far enough to carry the contact member beyond the circuit closer, and during the period of engagement the circuit closer yields and is forced away from its vertical position, which is permitted by the coiled spring 9, in order to permit the continuous movement of the chart holder. In order to adjust the parts for a particular operation, the contact member on the chart holder is moved manually by engaging the indicator 17 or the outer end of the contact member, turning it with reference to the chart until the indicator 17 coincides with the time indication on the chart at which the desired operation is to take place.

We claim as our invention:

1. In a circuit closing mechanism, the combination of a movable chart holder, an arm extending radially of the chart and adjustable circumferentially thereof, an indicator on said arm adapted to cooperate with a chart on said holder, a contact portion on the arm, adapted to be included in an electric circuit and a yieldable circuit closer mounted in the path of the contact portion.

2. The combination of a support, a rotary chart holder thereon, a member on one of said parts provided with an electrical contact and with an indicator and supported for adjustment about the axis of said holder as a center to bring said indicator into registry, selectively, with different points on the periphery of said holder, and a second electrical contact on the other of said parts for cooperation with said first contact.

3. In a recording instrument a rotary chart holder, a chart thereon having its periphery marked with indicia, a member provided with an electrical contact and with an indicator and supported for rotation with said holder and for adjustment relative thereto to bring said indicator into registry, selectively, with the indicia on said chart, and a second electrical contact disposed in the path of rotation of said first contact.

4. In a circuit closing mechanism for recording instruments, the combination of a support, a rotary chart holding disk thereon, a member supported for frictionally restrained adjustment circumferentially of the disk and for rotation therewith, indicating means on said member adapted to be brought into selective registry with the indicia of a chart on said disk by said circumferential adjustment of said member, and relatively yieldable contacts on said member and support adapted for inclusion in an electric circuit and arranged for engagement with each other during the rotation of said disk.

5. In a circuit closing mechanism for recording instruments, a support, an arbor rotatably carried by the support, a chart holding disk on said arbor, an arm supported for frictionally restrained adjustment about said arbor as a center and extending radially of said disk on the side of the latter opposite said chart, indicating means on the outer end of said arm extending over the periphery of said disk adjacent a chart on the latter, and relatively yieldable contacts on said arm and support adapted for inclusion in an electric circuit.

FREDERICK W. STALKER.
FRED K. TAYLOR.
LEWIS B. SWIFT.